US007028001B1

(12) United States Patent
Muthuswamy et al.

(10) Patent No.: US 7,028,001 B1
(45) Date of Patent: Apr. 11, 2006

(54) SYSTEM AND METHOD FOR MEASURING WEB PAGE ADVERTISEMENT IMPRESSIONS

(75) Inventors: Sivakumar Muthuswamy, Plantation, FL (US); Anupama Ramamurthy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/472,927

(22) Filed: Dec. 27, 1999

(51) Int. Cl.
  *G06F 17/60* (2006.01)
(52) U.S. Cl. ........................................ 705/14
(58) Field of Classification Search ............ 705/1, 705/10, 14
  See application file for complete search history.

(56) References Cited

U.S. PATENT DOCUMENTS

| 5,724,521 | A | * | 3/1998 | Dedrick ................... 705/10 |
| 5,948,061 | A | * | 9/1999 | Merriman et al. ........... 705/14 |
| 5,991,740 | A | | 11/1999 | Messer .................... 705/27 |
| 6,006,197 | A | * | 12/1999 | d'Eon et al. ............... 705/10 |
| 6,055,510 | A | * | 4/2000 | Henrick et al. .............. 705/1 |
| 2002/0004754 | A1 | * | 1/2002 | Gardenswartz et al. | |

FOREIGN PATENT DOCUMENTS

| WO | WO 96/33561 | * | 10/1996 | ............ 705/14 |
| WO | WO 01/09789 | * | 2/2001 | ............ 705/14 |

OTHER PUBLICATIONS

Marketing: Ads Delivered in Real Time; dot.COM, vol 2, No. 10, Jan. 1, 1996.*
Online Advertising; Interactive Content, No. 12, May 1, 1996.*
IAB Study: Banner Ads As Effective as Traditional Advertising; Multimedia Monitor, vol 15, No. 11, Nov. 1, 1997.*

* cited by examiner

*Primary Examiner*—Stephen M Gravini
(74) *Attorney, Agent, or Firm*—James A. Lamb; Barbara R. Doutre; Valerie M. Davis

(57) ABSTRACT

A system and method for measuring user interaction with a defined space, such as an advertisement space, on network site on a network, preferably being a web page of a website on the Internet. The system includes at least one server in communication with the network, and the server hosts one or more network sites where each network site includes a display area having one or more defined spaces, and each defined space has a predetermined area on the display area of the network site. The system further includes at least one user computer in communication with the network, and the user computer includes a browser that selectively interacts with the network sites, and has a cursor manipulated by the user about the display area of an interacted network site. The user computer selectively records interaction data relative to cursor placement on a specific defined space on the display area of the interacted network site and then transmits the interaction data to the server hosting the defined space. The method includes the steps of interacting with a network site with the browser on the user computer, selectively recording interaction data on the user computer relative to cursor placement on a specific defined space on the display area of the interacted network site, and transmitting the interaction data to the server hosting the defined space.

17 Claims, 3 Drawing Sheets

SYSTEM AND METHOD FOR MEASURING WEB PAGE ADVERTISEMENT IMPRESSIONS

BACKGROUND OF THE INVENTION

1. Field of the Invention

The present invention generally relates to computer networks. More particularly, the present invention relates to web pages on a network, such as the Internet, that display advertisements, and a system and method to monitor user interaction with the advertisements.

2. Description of the Related Art

The "Internet" or the "World-Wide-Web" is a medium that is increasingly used for advertising products and services. There are many commercial websites that provide individual interactive "pages" to a user on the Internet and the user can interact with the web pages of the website through the graphic-user interface (GUI) of the browser program resident on the computer of the user. Many websites provide useful information to users without charges to the user and the website hosts rely exclusively on advertising income to fund their continuing presence on the Internet. The advertisements are typically in separate, predefined spaces (i.e., areas or locations) on the web page, an example being a "banner ad," and the advertisements can include Java applets or other executing programs to provide motion and sound to the specific advertisement. The advertisement space can also serve as a link to the website of the particular advertiser of that advertisement such that the user can "click on," or activate the link to move the browser to the advertiser website.

For the website hosts that are funded by advertisement space sales, the value of the advertising space is often based on the number of impressions the website host can provide to the advertiser for the specific advertisement on the web page. Thus, website hosts desire to accurately measure the number of users who see the advertisements and how long each advertisement impression lasts in order to better rate advertising effectiveness for Internet advertisers. Unfortunately, there are no effective tools for obtaining these essential measurements, and as a result, advertisers are often wary about committing significant advertising dollars for web page advertisements.

One example of a current method to rate web page advertisement space effectiveness is called a "Click-through" ratio. A "click-through" ratio is defined as the number of users who "click on," or activate, a specific advertisement to the number of times the base web page is accessed by users. The "click-through" ratio, however, does not provide information relative to the amount of interaction by the user with the advertisement on the web page without actually "clicking on," or activating, the advertisement space. Therefore, the present invention is directed an improved system and method for obtaining web page advertisement user interaction data.

DETAILED DESCRIPTION OF THE INVENTION

Figure 1:
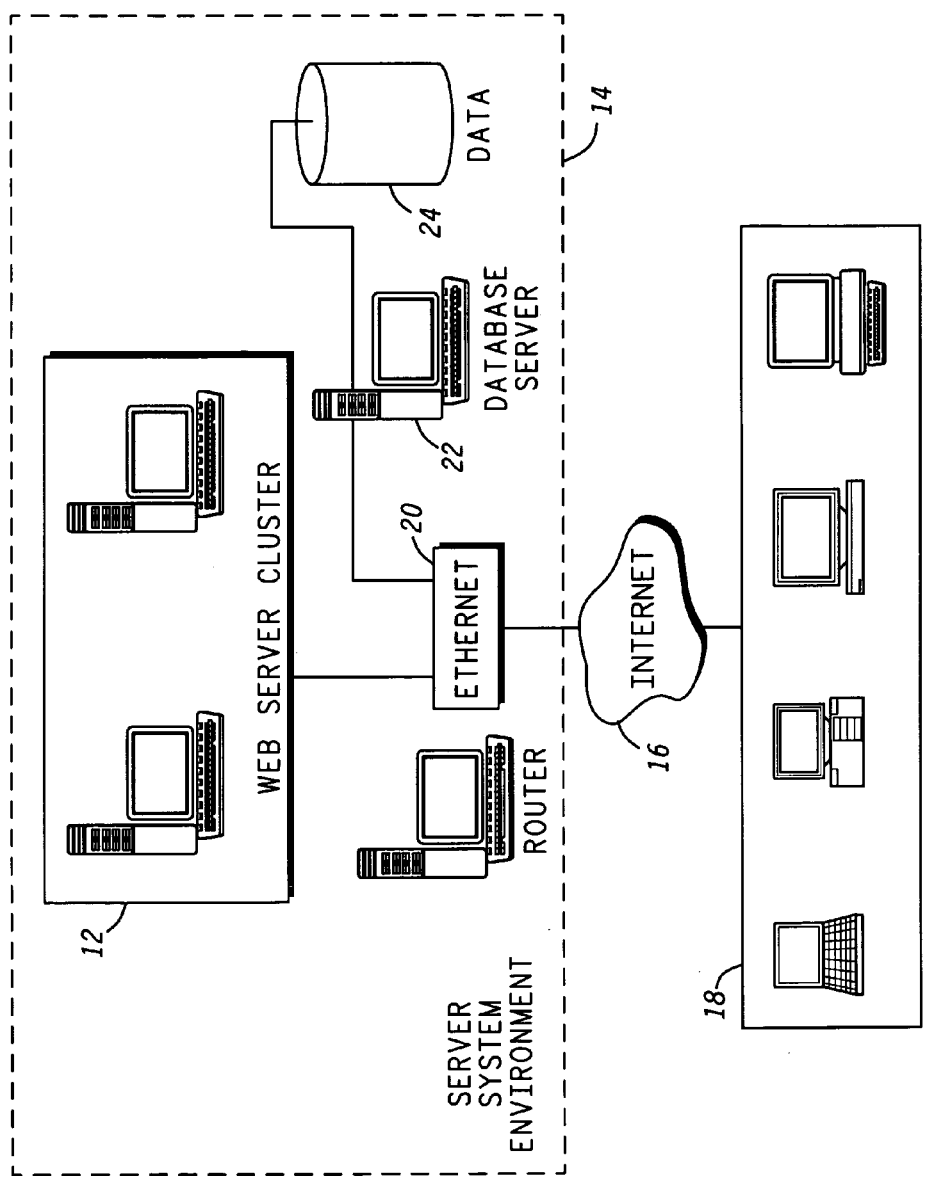
FIG. 1 is a representative diagram of one or more servers and one or more user computers interconnected through the Internet.
Figure 2:
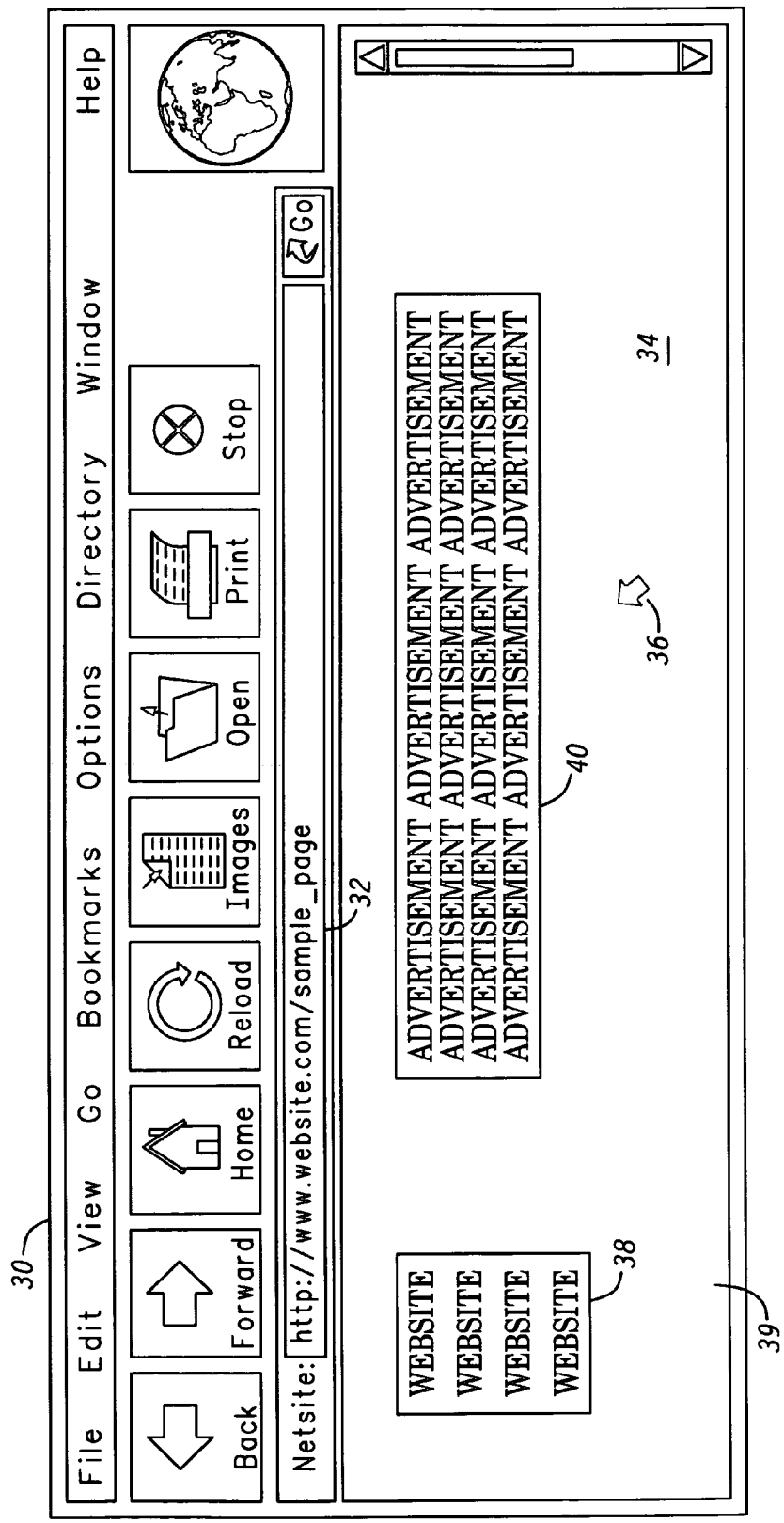
FIG. 2 is a graphic view of a browser GUI display for an example website, where the web page of the website illustrates one or more advertisements to the user and the user cursor is not on the advertisement space.
Figure 3:
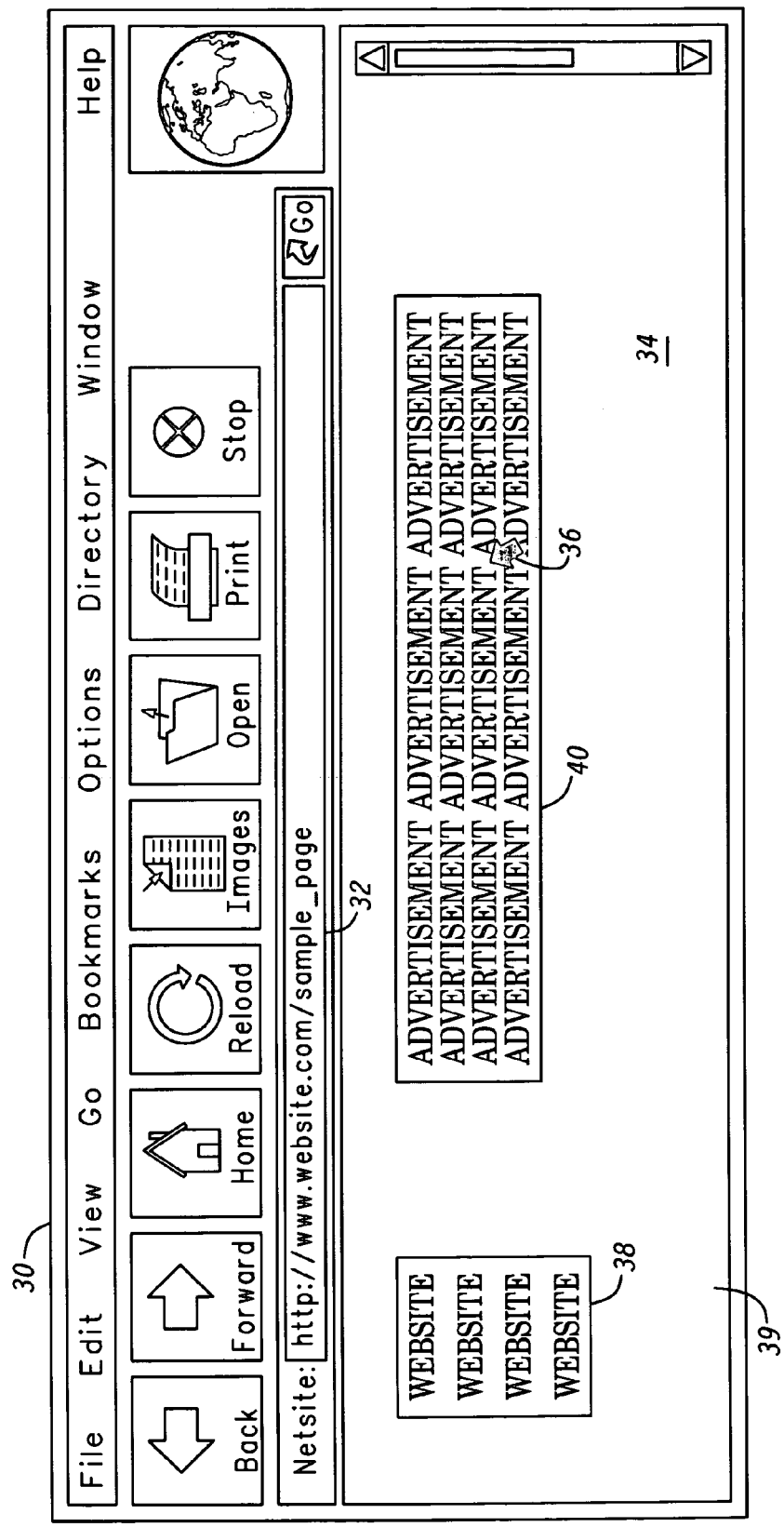
FIG. 3 is a graphic view similar to FIG. 2, where the user cursor is on the advertisement space.

Referring now to the drawings in which like numerals represent like components throughout the several views, FIG. 1 illustrates the present inventive system for measuring user interaction with a defined space on a network site of a network, which is preferably the Internet 16 and the network sites are preferably websites 32 and web pages 39, as shown in FIGS. 2 and 3. The defined space is preferably an advertisement space 40 as shown in FIGS. 2 and 3, however, any defined space on a web page is alternately used as a reference point for determination of cursor activity as defined herein. The system comprises at least one server, shown as a cluster of web servers 12, in a server system environment 14 in communication with the Internet 16, such configuration being well known in the art. In the illustrated server system environment 14, the web server cluster 12 is connected though an Ethernet 20, or other local area network (LAN) to the Internet 16, and to a database server 22 and a database 24. The LAN is typically implemented through a router that also connects the server system 14 to the Internet 16 and provides addresses for the individual web servers of the web server cluster 12 on the Internet 16.

The database server 22 and database 24 allow the web servers to store data relative to the websites and web pages on database 24, which can include the web page advertisement impression data as further discussed herein. The disclosed system is simply illustrative of a common web server arrangement for the Internet 16, and the present inventive system can be implemented without database server 22, database 24 and the Ethernet 20, or other LAN.

The system also includes at least one user computer, shown here as a plurality of user computers 18, in communication via the network, or Internet 16, with the server system environment 14 and the web server cluster 12. The user computers 18 each have a browser program that enables the user computer to view the websites and web pages maintained on the web servers of web server cluster 12.

Referring to FIGS. 2 and 3, each web server hosts one or more websites, such as website 32 which is hypothetically located at some fictitious web address The browser on each of the user computers 18 has a GUI display 30 to load the specific web page 39 of the website 32 where each website includes a web page display area 34 having a predefined space for web page material, such as web page material 38, and one or more predefined advertisement spaces, such as advertisement space 40. The advertising space 40 is typically a rectangular area on the web page display area 34, and can be a moving "banner ad" or have other executing programs in the advertisement space 40. The advertisement space 40 can also be a link to another website, such as the website of that specific advertiser, if activated by the user. The browser thus allows the user computer 18 to selectively interact with the website 32 through the usage of a cursor 36 that can be manipulated by the user about the web page display area 34 of interactive website 32, and also manipulated about the browser GUI display 30.

FIG. 2 particularly illustrates the cursor 36 in the web page display area 34 and not on the predefined advertisement space 40. Once the cursor 36 is moved onto the advertisement space 40, as shown in FIG. 3, the user computer 18 selectively records interaction data relative to the cursor 36 placement on the specific advertisement space 40 on the display area 34. The user computer ultimately transmits the interaction data to the server system environment 14 hosting the advertisement space 40 on the interacted website 32. Alternatively, the interaction data can be sent to the website server for the interacted website 32, and can ultimately be stored in a local or remote database, such as local database 24, or the interaction data can be stored on the individual web server in the web server cluster 12. In this alternative approach, the user computer 18 preferably transmits the interaction data to the advertisement space host or the server system environment 14 at the conclusion of the interaction between the browser of the user computer 18 and the interacted website 32.

The system preferably utilizes a software-based algorithm to compute the number and quality of "ad impressions," or an occurrence of the cursor 36 being placed onto the advertisement space 40. Because most of the commercially available web browsers provide the capability to programmatically track position of the cursor 36 within the browser GUI display 30 and have features for event handling, the system accordingly uses these features to measure various actions taken by the user and can combine the measured actions to compute an ad impression quality index for a specific advertisement space, such as advertisement space 40.

It should be noted that the present invention could be used to track interaction other than impressions with the advertisement or other defined space. Any user interaction pattern within the browser GUI display 30 can be tracked, such as the number of errors made navigating a page or cursor interaction with various portions of the page.

Many of the common internet browsers such as Netscape Navigator and Microsoft Internet Explorer have Java/JavaScript functionality, and thus Javascript is the preferred language of implementation of the cursor tracking program. The cursor tracking program can be resident in the browser, or it can alternately be resident on the user computer or downloaded with a web page. Javascript is an object-oriented scripting language developed by Netscape for building client/server internet applications. One of ordinary skill in the art will realize that the algorithms disclosed herein can also be implemented using other programming languages, such is Java or ActiveX.

In implementing the algorithm, the program recognizes the entry of the cursor 36 onto the advertisement space 40 and starts tracking the amount of time spent by the cursor 36 until the cursor 36 is no longer on the specific advertisement space 40 or the browser has exited the website 32. This tracking can be implemented in JavaScript using a combination of the following Script Event Handlers, date/timer objects, and associated methods as follows:

Script Event Handlers:

| | |
|---|---|
| onMouseOver: | triggered when cursor moves over an object or area from outside that object or area. |
| onFocus/onBlur: | triggered when a form element gains/loses focus or when a window or frame loses focus. |
| onClick: | when an object on a form is clicked. |
| onDblClick: | when the user double-clicks a form element or a link. |
| onMouseMove: | when the user moves the cursor. |
| onMouseOut: | each time the cursor leaves an area (client-side image map) or link from inside that area or link. |

Timer Methods:

| | |
|---|---|
| getTime: | returns the number of milliseconds for a date object. |
| getDate: | returns the day of the month for the specified date according to local time. |
| getDay: | returns the day of the week for the specified date according to local time. |
| getFullYear: | returns the year of the specified date according to local time. |
| getHours: | returns the hour in the specified date according to local time. |
| getMilliseconds: | returns the milliseconds in the specified date according to local time. |
| getMinutes: | returns the minutes in the specified date according to local time. |
| getMonth: | returns the month in the specified date according to local time. |
| getSeconds: | returns the seconds in the specified date according to local time. |
| getTime: | returns the numeric value corresponding to the time for the specified date according to local time. |

The script event handlers allow tracking of the location of the cursor in the browser GUI display 34, and the Timer commands allow recordation of the time relative to the cursor 36 movements. Tracking of cursor 36 activity will continue until the on Unload event handle is triggered. When this event is triggered, it indicates that the user is exiting the web page 39. Once all the cursor 36 tracking inputs have been logged, the algorithm computes a quality metric for that impression of the ads in the web page 39 and transmits the interaction data across the Internet 16 to the HTTP server, such as the servers in web server cluster 12, that originally served the web page 39 with the advertisement space 40.

Accordingly, examples of the preferred tracking parameters logged to compute the ad impression quality index are; (1) the length of time the cursor is inside the advertisement space; (2) the number of times the advertisement space has input focus; (3) the number of times or the frequency of cursor entry and exit of the advertisement space; (4) the amount of time the user spends viewing this web page; and (5) the on Select events, or an event indicating that the user has activated or "clicked" the advertisement space link to the advertiser's website.

An example of programmatically computing the quality index for an on Select event is therefore:

```
if (on Select =="TRUE")
{
   Ad Impression Quality Index=1
}
else
{
   Ad Impression Quality Index=(time in ad area/total
      time in page)
}
```

Depending on the focus of the advertiser and the expected feedback, this algorithm can be modified to customize the ad impression index and include additional measured parameters for the cursor 36 activity on the browser GUI display 30. Further, in order to minimize tracking of erroneous information, the cursor 36 tracking mechanism should preferably stop logging interaction data if there is no cursor 36 on the browser GUI display 30 for a specified threshold time period.

The present inventive system as disclosed in FIGS. 1–3 accordingly provides an inventive method for measuring user interaction with an advertising space 40 on a network site (such as web page 39 of web site 32) hosted by a server on a network, such as the Internet 16. At least one user computer, such as one of user computers 18, is in communication therewith and has a browser that selectively interacts with the website 32, the user computer further having a cursor 36 manipulated by the user about the browser GUI display area 30 of an interacted website 32. The method includes the steps of interacting with a website 32 through the browser GUI display 30 on the user computer 18, selectively recording interaction data on the user computer 18 relative to cursor 36 placement on a specific advertisement space 40 on the web page display area 34 of the interacted website 32, and transmitting the interaction data to the server, or server system environment 14 hosting the advertisement space 40.

As discussed above, as the network is the preferably the Internet, the step of interacting with a network site is preferably interacting with a web site through the browser on the user computer. Accordingly, the step of selectively recording interaction data on the user computer relative to cursor placement on a specific advertisement space on the display area of the interacted network site is preferably selectively recording interaction data on the user computer 18 relative to cursor 36 placement on a specific advertisement space 40 on the web page display area 34 of the interacted website 32 through execution of a Javascript program on the user computer.

Further, the step of transmitting the interaction data to the server hosting the advertisement space 40 is preferably transmitting the interaction data to the server hosting the advertisement space 40 at the conclusion of the interaction between the browser of the user computer and the interacted website 32. The step of selectively recording interaction data on the user computer relative to cursor 36 placement on a specific advertisement space 40 on the web page display area 34 of the interacted website 32 is achieved by selectively recording interaction data on the user computer relative to frequency of the cursor 36 placement on a specific advertisement space 40, or selectively recording interaction data on the user computer relative to the duration of the cursor 36 placement on a specific advertisement space 40. Frequency of cursor placement means, for example, the number of times the cursor enters and exits the advertisement area.

While there has been shown preferred and alternative embodiments of the present invention, it is to be understood that certain changes may be made in the forms and arrangements of the components and steps of the inventive method without departing from the spirit and scope of the invention as set forth in the claims appended herewith.

What is claimed is:

1. A system for measuring user interaction with a defined space on a network site of a network, the system comprising:
   at least one server in communication with the network, the server hosting one or more network sites where each network site includes a display area having one or more defined spaces, each defined space having a predetermined area on the display area of the network site;
   at least one user computer in communication with the network, the user computer including a browser that selectively interacts with network sites, the user computer further having a cursor manipulated by the user about the display area of an interacted network site, and the user computer selectively recording interaction data relative to cursor placement and time relative to movement on a specific defined space on the display area of the interacted network site and transmitting the interaction data to the server hosting the defined space where the interaction data is computed using a metric algorithm from a combination of at least one position tracking interaction parameter selected from the group consisting of:
   the number of times a defined space has cursor input focus;
   the frequency of cursor entry and exit of a specific defined space; and
   at least one time tracking interaction parameter selected from the group consisting of:
      length of time the cursor is inside a specific defined space;
      average length of time between loss of cursor input focus of the defined space and regain of cursor input focus of the defined space; and
      the total length of time the cursor is inside a specific defined space between loading and unloading of display area of the interacted network site within the browser; and
   wherein the position tracking interaction parameters are measured using one or more cursor position tracking event handlers available in the user computer and the time tracking interaction parameters are measured using at least one timer event available in the user computer.

2. The system of claim 1, wherein: the network is the Internet; and the network site is a website.

3. The system of claim 2, wherein the user computer records the interaction data by execution of a program in JavaScript.

4. The system of claim 2, wherein the user computer transmits the interaction data to the server hosting the defined space at the conclusion of the interaction between the browser of the user computer and a website.

5. The system of claim 1, wherein the user computer records interaction data including frequency of the cursor placement on a specific defined space.

6. A method for measuring user interaction with a defined space on a network site hosted by a server on a network, each network site including a display area that has one or more defined spaces where each defined space has a predetermined area on the display area, the network further having at least one user computer in communication therewith including a browser that selectively interacts with network sites, the user computer further having a cursor manipulated by the user about the display area of an interacted network site, the method comprising the steps of:
   interacting with a network site through the browser on the user computer;
   selectively recording interaction data on the user computer relative to cursor placement and time relative to movement on a specific defined space on the display area of the interacted network site where the interaction data is computed using a metric algorithm from a combination of at least one position tracking interaction parameter selected from the group consisting of:
   the number of times a defined space has cursor input focus;
   the frequency of cursor entry and exit of a specific defined space; and
   at least one time tracking interaction parameter selected from the group consisting of:
      length of time the cursor is inside a specific defined space;

average length of time between loss of cursor input focus of the defined space and regain of cursor input focus of the defined space; and the total length of time the cursor is inside a specific defined space between loading and unloading of display area of the interacted network site within the browser; and wherein the position tracking interaction parameters are measured using one or more cursor position tracking event handlers available in the user computer and the time tracking interaction parameters are measured using at least one timer event available in the user computer; and transmitting the interaction data to the server hosting the defined space.

7. The system of claim 1, wherein the defined space is a web page of a website.

8. A method for measuring user interaction with a defined space on a network site hosted by a server on a network, each network site including a display area that has at least one defined space where each defined space has a predetermined area on the display area, the network further having at least one user computer in communication therewith including a browser that selectively interacts with network sites, the user computer further having a cursor manipulated by the user about the display area of an interacted network site, the method comprising the steps of:

interacting with a network site through the browser on the user computer;

selectively recording interaction data on the user computer relative to cursor placement on a specific defined space on the display area of the interacted network site; where the interaction data is computed using a metric algorithm from a combination of at least one position tracking interaction parameter selected from the group consisting of:

the number of times a defined space has cursor input focus;

the frequency of cursor entry and exit of a specific defined space; and at least one time tracking interaction parameter selected from the group consisting of:

length of time the cursor is inside a specific defined space;

average length of time between loss of cursor input focus of the defined space and regain of cursor input focus of the defined space; and the total length of time the cursor is inside a specific defined space between loading and unloading of display area of the interacted network site within the browser; and wherein the position tracking interaction parameters are measured using one or more cursor position tracking event handlers available in the user computer and the time tracking interaction parameters are measured using at least one timer event available in the user computer; and transmitting the interaction data to the server hosting the defined space.

9. The method of claim 8, wherein:
the network is the Internet; and
the step of interacting with a network site through the browser on the user computer network site comprises interacting with a website through the browser on the user computer.

10. The method of claim 8, wherein the step of selectively recording interaction data on the user computer relative to cursor placement on a specific defined space on the display area of the interacted network site comprises selectively recording interaction data on the user computer relative to cursor placement on a specific defined space on the display area of the interacted network site through execution of a JavaScript program on the user computer.

11. The method of claim 8, wherein the step of transmitting the interaction data to the server hosting the defined space comprises transmitting the interaction data to the server hosting the defined space at the conclusion of the interaction between the browser of the user computer and the interacted network site.

12. The method of claim 8, wherein the step of selectively recording interaction data on the user computer comprises selectively recording interaction data on the user computer relative to frequency of the cursor placement on a specific defined space on the display area of the interacted network site.

13. The method of claim 8, wherein the step of selectively recording interaction data on the user computer comprises selectively recording interaction data on the user computer relative to the duration of the cursor placement on a specific defined space on the display area of the interacted network site.

14. A system for measuring user interaction with a defined space on a network site of a network, the system comprising:

at least one server in communication with the network, the server hosting one or more network sites where each network site includes a display area having one or more defined spaces, each defined space having a predetermined area on the display area of the network site; and at least one user computer in communication with the network, the user computer including a browser that selectively interacts with network sites, the user computer further having a cursor manipulated by the user about the display area of an interacted network site, and the user computer selectively recording interaction data relative to a location of a cursor on a display area and the duration upon which the cursor is left at the specific location on the display area of the interacted network site and transmitting the interaction data to the server hosting the defined space; and where the interaction data is computed using a metric algorithm from a combination of at least one position tracking interaction parameter selected from the group consisting of:

the number of times a defined space has cursor input focus;

the frequency of cursor entry and exit of a specific defined space; and at least one time tracking interaction parameter selected from the group consisting of:

length of time the cursor is inside a specific defined space;

average length of time between loss of cursor input focus of the defined space and regain of cursor input focus of the defined space; and the total length of time the cursor is inside a specific defined space between loading and unloading of display area of the interacted network site within the browser; and wherein the position tracking interaction parameters are measured using one or more cursor position tracking event handlers available in the user computer and the time tracking interaction parameters are measured using at least one timer event available in the user computer.

15. The system of claim 14, wherein the network is the Internet; and the network site is a website.

16. The system of claim 14, wherein the user computer records the interaction data by execution of a program in JavaScript.

17. The system of claim 15, wherein the user computer transmits the interaction data to the server hosting the defined space at the conclusion of the interaction between the browser of the user computer and a website.

* * * * *